(12) United States Patent
Miyabayashi et al.

(10) Patent No.: US 6,327,004 B1
(45) Date of Patent: Dec. 4, 2001

(54) PICTURE REPLACEMENT SYSTEM AND METHOD OF THE SAME

(75) Inventors: Satoshi Miyabayashi; Toru Koguma, both of Tokyo (JP)

(73) Assignee: Nippon Television Network Corp. (JP)

( * ) Notice: Subject to any disclaimer, the term of this patent is extended or adjusted under 35 U.S.C. 154(b) by 0 days.

(21) Appl. No.: 09/423,716

(22) PCT Filed: Mar. 18, 1999

(86) PCT No.: PCT/JP99/01353

§ 371 Date: Nov. 12, 1999

§ 102(e) Date: Nov. 12, 1999

(87) PCT Pub. No.: WO99/48285

PCT Pub. Date: Sep. 23, 1999

(30) Foreign Application Priority Data

Mar. 18, 1998 (JP) .................................................. 10-068621

(51) Int. Cl.$^7$ ............................... H04N 9/74; H04N 5/262
(52) U.S. Cl. .......................... 348/590; 348/591; 348/578; 348/239
(58) Field of Search ..................................... 348/578, 581, 348/583, 580, 584, 585, 586, 587, 590, 591, 598, 600, 589, 239; H04N 9/74, 9/76, 5/262

(56) References Cited

U.S. PATENT DOCUMENTS 5,973,751 * 10/1999 Ishida .................................... 348/590

FOREIGN PATENT DOCUMENTS

| 57-093788 | 6/1982 | (JP) . |
| 3-029472 | 2/1991 | (JP) . |
| 7-502385 | 3/1995 | (JP) . |
| 9-504666 | 5/1997 | (JP) . |
| 9-252427 | 9/1997 | (JP) . |
| 9-252429 | 9/1997 | (JP) . |

* cited by examiner

*Primary Examiner*—Sherrie Hsia
(74) *Attorney, Agent, or Firm*—Ostrolenk, Faber, Gerb & Soffen, LLP

(57) ABSTRACT

A reference picture being as a reference of the replacement area, the reference position of the replacement area and the size of the replacement area has been memorized. Moreover, a replacing LOGO picture has also been memorized. A two dimensional movement amount of a camera is detected by a rotary encoder set on the pan head of the camera, and the detected movement amount is outputted as a movement information. In the picture synthesis device, an address of the reference position of the replacement area in the present picture is calculated based on the movement information, and the replacement area is detected with this address as reference. Then, a key signal indicating a picture in which the present picture and the reference picture within the replacement area are identical or different, and an identical portion between the present picture and the reference picture is replaced with a LOGO picture corresponding to the foregoing identical portion out of the LOGO picture based on this key signal.

26 Claims, 10 Drawing Sheets

PICTURE REPLACEMENT SYSTEM AND METHOD OF THE SAME

FIELD OF THE INVENTION

The present invention relates to an art which replaces a predetermined picture of an area with a LOGO, particularly to an art which replaces the picture with the LOGO so that the replacing LOGO appears just like a portion of the present picture corresponding to the changes of a present picture.

Recently, accompanied with the prosperity of the TV broadcastings, a great number of advertisements are televised through the TV broadcastings. For example, in the case of a broadcast of a baseball game, the advertisements behind the baseball players, for example, the names of the firms, the LOGOs, the slogans and the like, together with the movements of the baseball players, are shot by the TV camera and broadcast.

Now, there were cases that a broadcast would have been required in a state where the original LOGOs were deleted and replaced with other LOGOs only during the live broadcasting on the TV screen because of some circumstances. Moreover, there were also cases that LOGOs would have been drawn at a place where nothing was originally drawn on only during the live broadcast on the TV screen.

However, according to the prior art, it was easily performed to replace only the predetermined area of a certain picture with the specified LOGOs, but the prior art could not replace the picture with the specified LOGOs as if the LOGOs have originally been there. For example, as exemplifying a live broadcast of a baseball game on the TV screen described above, if LOGOs drawn on the back fence of the field was tried to be replaced with the other LOGOs, since even the players who stood in front of the LOGOs were also replaced with the LOGOs, the pictures were intolerable ones for broadcastings.

Accordingly, an object of the present invention is to provide an art which replaces a portion of a present picture with LOGOs as if they might have been portions of the present picture corresponding to the changes of the present picture.

SUMMARY OF THE INVENTION

The above described object of the present invention is achieved by the picture replacement system which is characterized in that it comprises; a pan head; a camera set on the foregoing pan head; a rotary encoder embedded in the foregoing pan head for detecting the movement amount and outputting the detected movement amount as a movement information; reference picture memorizing means in which a reference picture being as a reference of an area to be replaced was stored; LOGO picture memorizing means in which replacing LOGO pictures were stored; position detection means for detecting a position of a replacement area in a present picture taken by the foregoing camera on the basis of the foregoing movement information; key signal generation means for comparing the present picture within a replacement area detected by the foregoing position detection means with a reference picture within the foregoing replacement area memorized in the foregoing reference picture memorizing means and generating a key signal indicating a portion in which the present picture and the reference picture are identical or different; and replacement means for replacing a portion in which the present picture and the reference picture are identical with a LOGO picture corresponding to the foregoing identical portion out of the foregoing LOGO picture.

It should be noted that it is desirable that the size of a reference picture is stored as well as a reference picture is stored per one pixel unit in the above described reference picture memorizing means, and the above described position detection means has converting means for converting a movement information into an address information of the screen and position area detection means for detecting a replacement area in the present picture on the basis of the foregoing address information and the size of the reference picture.

Moreover, the above described replacement means is a switch selectable per one pixel unit on the basis of a key signal, it is desirable that the replacement means is constituted so that in the case where a key signal indicates that the present picture and the reference picture are identical, it switches to the side of inputting the corresponding LOGO picture, in the case where a key signal indicates that the present picture and the reference picture are different, it switches to the side of inputting the present picture, and only the portion in which the present picture and the reference picture within the replacement area of the present picture are identical is replaced with LOGO picture.

Moreover, the shooting power is changeable, if the replacement means further has a lens outputting power information according to the shooting power, replacement area adjustment means for adjusting a replacement area detected by the foregoing position detection means on the basis of the foregoing power information, and means for changing the LOGO picture memorized in the foregoing LOGO picture memorizing means on the basis of the power information, it is also applicable to the shooting which changes the shooting power.

The above described object of the present invention is a picture replacement system for replacing a picture of a predetermined area of the present picture with a desired LOGO picture, is achieved by the foregoing replacement system, which is characterized in that it comprises: a pan head; a camera set on the foregoing pan head; a rotary encoder embedded in the foregoing pan head for detecting the two dimensional movement amount of the camera and outputting a detected movement amount as a movement information; reference picture memorizing means in which a reference position of the foregoing replacement area and lengths of vertical and horizontal directions of replacement area with the foregoing reference position as the reference are stored as well as a reference picture to be a reference of a replacement area; LOGO picture memorizing means in which replacing LOGO pictures were stored; calculating means for calculating address of a reference position of the foregoing replacement area in the present picture on the basis of the foregoing movement information; replacement area detection means for detecting a replacement area in the present picture from the lengths of vertical and horizontal directions of the foregoing replacement area with the foregoing calculated address as a reference position; key signal generation means for comparing the present picture within the foregoing detected replacement area with the reference picture within the foregoing replacement area and generating a key signal indicating that pixels where the present picture and the reference picture are identical or different; and replacement means for replacing a portion in which the present picture and the reference picture are identical with the LOGO picture corresponding to the foregoing identical potion out of the foregoing LOGO picture.

It should be noted that the above described calculating means has previously memorized a movement information (α, β) and an address (A,B) of a reference position of a replacement area at the time when a replacement area is located at the first position of the screen, and a movement information (α, δ) and an address (C,D) of the reference position of a replacement area at the time when a replacement area is located at the second position of the screen, and by substituting a movement information (λ, μ) which is available at the time when a replacement area moved to a given position of the present picture into the following equations expressed by, $$x=A+(\lambda-\mu)\times(C-A)/(\gamma-\alpha)$$

$$y=B+(\mu-\beta)\times(D-B)/(\delta-\gamma)$$

an address (x, y) of a reference position of a replacement area at the time when the replacement area moved to a given position is calculated.

Moreover, it is desirable that the replacement area detection means further has means for determining whether an address of each pixel within the replacement area which is detected with an address of the reference position as center is within the screen frame or not and detecting an area constituted of only pixels of addresses which are determined within the foregoing frame as a replacement area.

Moreover, it is desirable that the replacement means is a switch selectable per one pixel unit on the basis of a key signal and is constituted so that this switch switches to the side of inputting the corresponding LOGO picture in the case where a key signal indicates that the present picture and the reference picture are identical ones, it switches to the side of inputting the present picture in the case where a key signal indicates that the present picture and the reference signal are different and only the portion in which the present picture and the reference picture within the replacement area of the present picture are identical is replaced.

Furthermore, in the case where the present invention further comprises: a lens whose shooting power is changeable and outputting a power information according to a shooting power; picture converting means for changing the size of a memorized LOGO picture, the sizes of a memorized reference picture and a reference picture on the basis of the foregoing power information to the sizes according to the shooting power; adjusting means for adjusting an address of a reference position of the calculated replacement area on the basis of the foregoing power information; replacing area detecting means for detecting a replacement area from an address of the foregoing adjusted reference position and the size of the foregoing changed reference picture; key signal generation means for comparing the present picture within the foregoing detected replacement area with the foregoing reference picture whose size is changed and generating a key signal indicating that the pixels where the present picture and the reference picture are identical or different; and replacement means for replacing the portion in which the present picture and the reference picture are identical with LOGO picture corresponding to the foregoing identical portion out of the LOGO picture whose the foregoing size is changed, the present invention can be applied to the shooting whose shooting power is changed.

It should be noted that it is desirable that when assuming that a calculated address data is (x, y), a shooting power is f (z), the number of pixels of horizontal direction is H, the number of pixels of vertical direction is L, the above described adjustment means calculates an address data (X, Y) of the reference position R of a new replacement area by the following equations, $$X=(x-H/2)\times f(z)+H/2$$

$$Y=(y-L/2)\times f(z)+L/2$$

The above described object of the present invention is a picture replacement method for replacing a picture of a predetermined area out of the present picture with a desired LOGO picture, is achieved by the foregoing picture replacement method which is characterized in that it comprises the steps of: shooting a subject and selecting a replacement area out of the subject which is replaced with a LOGO picture: memorizing the reference position within the foregoing replacement area and lengths of vertical and horizontal directions of the foregoing replacement area with the foregoing reference position as the reference as well as memorizing the picture within the foregoing replacement area as the reference picture; generating a replacing LOGO picture, detecting a memorizing step and the two dimensional movement amount of a camera which is shooting the present picture and outputting this movement amount as a movement information; calculating an address of a reference position of the foregoing replacement area in the present picture on the basis of the foregoing movement information; detecting a replacement area in the present picture from lengths of vertical and horizontal directions of the foregoing memorized replacement area with the foregoing calculated address as the reference position; comparing the present picture within the foregoing detected replacement area with the reference picture within the foregoing replacement area and generating a key signal indicating that the pixels where the present picture and the reference picture are identical or different; and replacing the portion in which the present picture and the reference picture are identical with the picture corresponding to the foregoing identical portion out of the foregoing LOGO picture on the basis of the foregoing key signal.

It should be noted that it is desirable that a step of calculating an address of the reference position of the above described replacement area obtains an address (x, y) of the reference position of a replacement area from the steps of: memorizing previously a movement information (α, β) and an address (A,B) of the reference position of a replacement area at the time when the replacement area is at the first position on the screen ; memorizing previously a movement information (γ, δ) and an address (C,D) of the reference position of a replacement area at the time when the replacement area is at the second position; substituting a movement information (λ, μ) which is available at the time when the replacement area moved to a given position of the present position into the following equations, $$x=A+(\lambda-\alpha)\times(C-A)/(\gamma-\alpha)$$

$$y=B+(\mu-\beta)\times(D-B)/(\delta-\beta)$$

and obtaining an address (x, y) of the reference position of a replacement area at the time when the replacement area moved to a given position.

Moreover, it is desirable that a step of detecting the above described replacement area determines whether an address of each pixel within the detected replacement area with the address of the reference position as center is within the screen frame or not and detects an area which is constituted of only pixels determined within the foregoing frame as a replacement area.

Moreover, it is desirable that a step of replacing the present picture with the above described LOGO picture replaces the pixels of the picture portion in which the present picture and the reference picture are identical with the pixel data of the LOGO picture corresponding to these pixels and making pixels of the picture portion in which the present picture and the reference picture is different be pixel data of the present picture as they are on the basis of a key signal.

Furthermore, in the case where the present invention further comprises the steps of: detecting a shooting power; changing the size of a memorized LOGO picture, the sizes of the memorized reference picture and the reference picture on basis of the foregoing shooting power; adjusting an address of the reference position of the calculated replacement area on the basis of the foregoing power information; detecting a replacement area from an address of the foregoing adjusted reference position and the size of the foregoing changed reference picture; comparing the present picture of the foregoing detected replacement area with the foregoing reference picture whose size is changed and generating a key signal indicating that the pixels in which the present picture and the reference picture are identical or different; and replacing the portion where the present picture and the reference picture are identical with the LOGO picture corresponding to the foregoing identical portion out of the foregoing LOGO picture whose size is changed, the present invention can be applied to the shooting whose shooting power is changeable.

It should be noted that it is desirable that on the assumption of the calculated address data being (x, y), the shooting power being f (z), the number of pixels of horizontal direction being H, and the number of vertical direction being L, a step of adjusting an address of the reference position calculates an address data (X, Y) of the reference position R of a new replacement area by the following equations;

$$X=(x-H/2)f(z)+H/2$$

$$Y=(y-L/2)f(z)+L/2$$

BRIEF DESCRIPTION OF THE DRAWINGS

This and other objects, features and advantages of the present invention will become more apparent upon a reading of the following detailed description and drawings, in which.

BEST MODE FOR CARRYING OUT THE INVENTION

For the purpose of describing the present invention more particularly in detail, the present invention will be described according to the drawings contained in the attachments to the specification.

In the present description, assuming that the picture at which a camera is now shooting is the present picture, and the replacing picture as a substitute for the picture of the predetermined area in the present picture is called as a LOGO picture. Moreover, data (movement amount) of the pan and tilt of the camera which is outputted from the rotary encoder is called as a pan head data, and is expressed in the form of (pan, tilt)=($\alpha$, $\beta$) of the two dimension. Furthermore, data for determining a given position on the screen is called address data, and expressed in the form of (x, y) of the two dimension. It should be noted that as for the size(the number of pixels) of one screen (frame), the upper-left apex is assumed as a point of origin (0, 0), and the lower-right apex is assumed as a point (720,480) as shown in FIG. 1.

Before describing a system of the present invention, a method of the present invention will be described with reference to the drawings.

Firstly, the reference picture being as the reference is shot by the camera set at the basic camera position. FIG. 1 is a diagram for describing a shooting method of the reference picture. It should be noted that the reference picture is shot in a state where there is nothing to interrupt the picture within the later described replacement area. For example, the picture is shot in a state where any portion of the picture is not lacking because of nobody standing in front of the picture within the replacement area.

Figure 1:
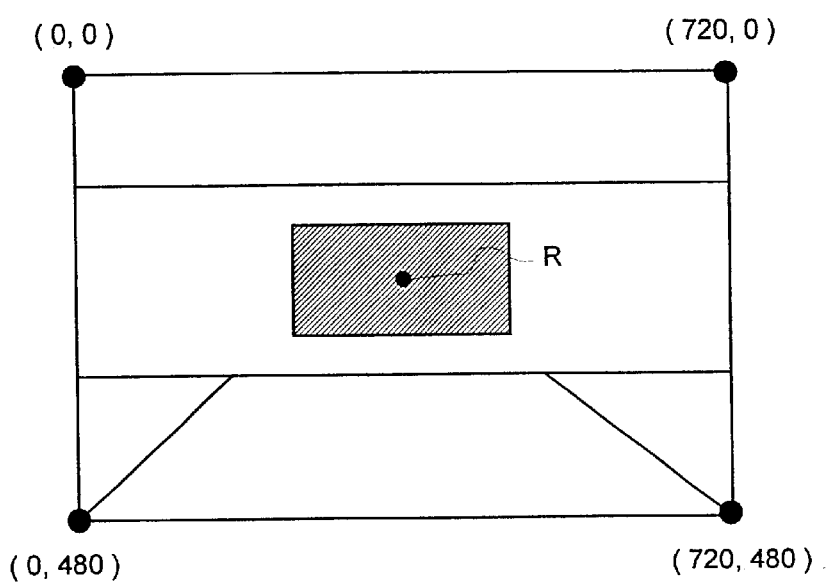
FIG. 1 is a diagram for describing a method of the present invention.
Figure 2:
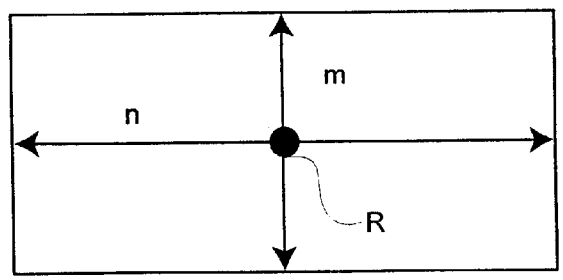
FIG. 2 is a diagram for describing a method of the present invention.

Secondly, a replacement area to be replaced with a desired LOGO is selected from the reference picture (FIG. 1). In the present description, a square area which is diagonally shaded shown in FIG. 1 is assumed as a replacement area. Then, the size of the replacement area and the picture within the replacement area is memorized per one pixel unit as the reference picture. It should be noted that as for the size of the replacement area, lengths of vertical and horizontal directions on the assumption of the predetermined position R (hereinafter, called a reference position) within the replacement area being as the center (a point of origin) is memorized. In FIG. 2, as for the size of the replacement area, length of vertical direction is shown as m, and thus length of horizontal direction is shown as n on the assumption of the reference position as R.

Figure 3:
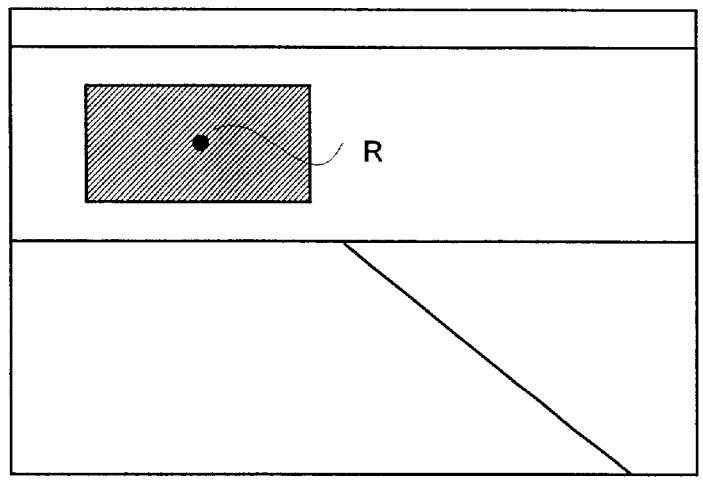
FIG. 3 is a diagram for describing a method of the present invention.
Figure 4:
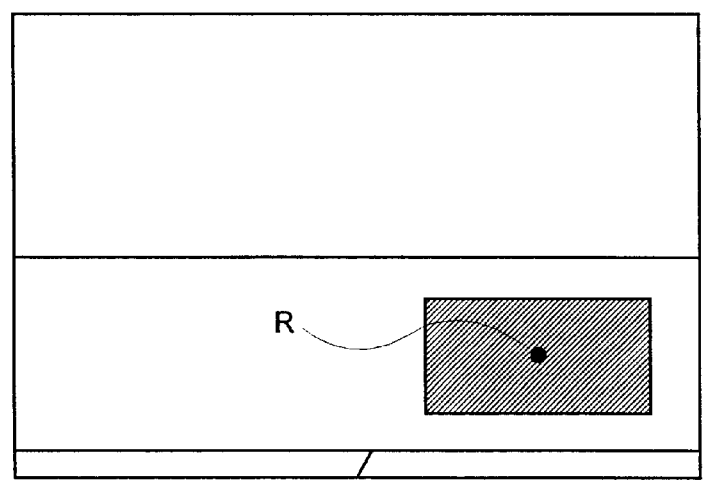
FIG. 4 is a diagram for describing a method of the present invention.

Subsequent to the above, as shown in FIG. 3, the camera is moved to such a position where the replacement area is projected on the upper-left portion of the screen. Then, the pan head data ($\alpha$, $\beta$) at this position and an address data (A,B) of the reference position R of the replacement area are memorized. In a similar manner, as shown in FIG. 4, the camera is moved to such a position where the replacement area is projected on the lower-right portion of the screen. Furthermore, the pan head data ($\gamma$, $\delta$) at this position and an address data (C,D) of the reference position R of the replacement area are memorized.

Concerning with the reason why such procedures are taken, it can be said it needs that pan head data obtained from the rotary encoder is converted to an address within the screen. Specifically, only if the pan head data (α, β) at the time when the replacement area is on the upper-left portion of the screen, an address data (A, B) of the reference position R of the reference area, the pan head data (γ, δ) at the time when the replacement area is on the lower-right portion of the screen and an address data (C, D) of the reference position R of the replacement area have been previously memorized, an address data (x, y) of the reference position R of the replacement area at the time is obtained from the pan head data (λ, μ) which is to be inputted later by the following equation (1), and equation (2);

$$x = A + (\lambda - \alpha) \times (C - A)/(\gamma - \alpha) \quad \text{equation (1)}$$

$$y = B + (\mu - \beta) \times (D - B)/(\delta - \beta) \quad \text{equation (2)}$$

After completing the preparation as described above, the shooting of performance is inaugurated.

As the shooting of performance is inaugurated, an address data of the reference position R of the replacement area is obtained out of the picture (the present picture) of performance which was shot by the camera. This calculation is calculated on the basis of an available pan head data by the above described equation (1), and equation (2).

Figure 5:
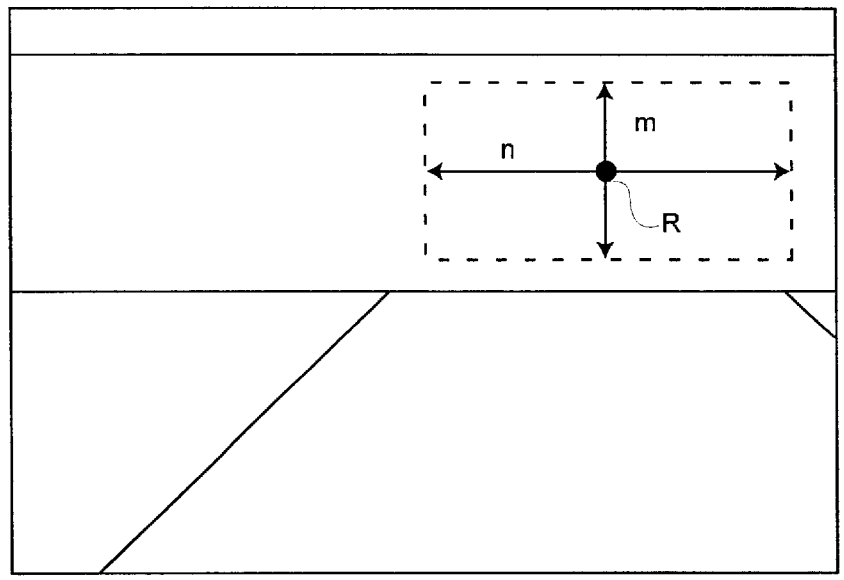
FIG. 5 is a diagram for describing a method of the present invention.

Next, the replacement area on the present picture is specified from the address data which was obtained. For example, as shown in FIG. 5, considering the case where the replacement area is on the upper-right portion of the screen.

Firstly, assuming that a position of the present picture corresponding to the obtained an address data (x, y) is the reference position R. Then, with the reference position R as center, a square area uniquely determined by the memorized vertical directional length m and horizontal directional length n is detected as a replacement area. Specifically, since the size of the replacement area has been already memorized, if an address data (x, y) of the reference position R to be the registration position for the purpose of superimposing it on the present picture is obtained, the position in the present picture of the replacement area is automatically determined.

Figure 6:
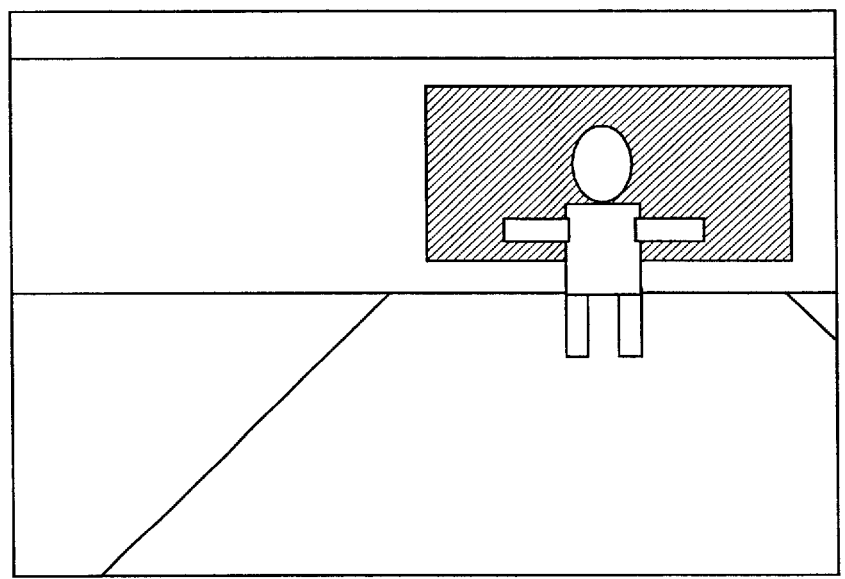
FIG. 6 is a diagram for describing a method of the present invention.

Here, as shown in FIG. 6, assuming the case where a person stands in front of the replacement area. In this case, as the memorized reference picture data (for example, brightness, color-difference or the like) is subtracted from the present picture data (for example, brightness, color-difference or the like) within the detected replacement area per one pixel unit, in the case of the pixels of the picture portion in which the present picture and the reference picture are identical, the subtraction result is 0, in the case of the pixels of the picture portion in which the present picture and the reference picture are different, the subtraction result is not 0. Specifically, the picture portion of a person out of the present picture is not 0, the other portion of the picture is 0.

Figure 7:
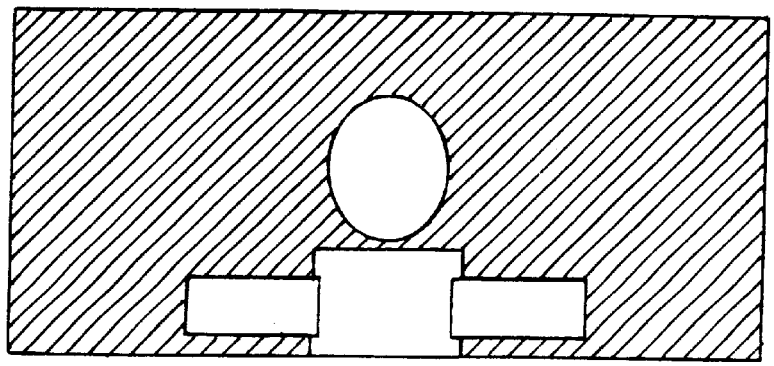
FIG. 7 is a diagram for describing a method of the present invention.

Secondly, a key signal is generated by utilizing this result. This key signal is a signal that differentiates pixels of the picture portion in which the present picture and the reference picture are identical with pixels of the picture portion in which the present picture and the reference picture are different, and usually, the pixel of identical picture portion is shown as 0, and the pixel of different picture portion is shown as 1. FIG. 7 is a diagram showing a conception of a key signal. In FIG. 7, the black colored portion indicates the pixel portion in which the present picture and the reference picture are identical, and the hollow portion indicates the pixel portion in which the reference picture and the present picture are different. As shown in FIG. 7, the difference between the present picture and the reference picture can be differentiated. Specifically, the picture portion behind a person out of the picture within the replacement area is differentiated.

Figure 8:
FIG. 8 is a diagram for describing a method of the present invention.

Finally, the picture within the replacement area is replaced with a predetermined LOGO by utilizing a key signal. Here, assuming that the LOGO shown in FIG. 8 with which the picture within the replacement area is replaced. Noted that the replacement LOGO has been previously generated as a LOGO picture. For example, the picture of LOGO shown in FIG. 8 and the picture around this LOGO has been generated in a set. As a method of replacing, when a key signal is 0, that is to say, in the case where the pixels of the picture potion in which the present picture and the reference picture are identical, the picture within the replacement area are replaced with the picture of the corresponding pixels out of a LOGO picture which have been previously generated. Moreover, when a key signal is 1, that is to say, in the case where the pixels of the picture portion in which the present picture and the reference picture are different, the present picture is determined to remain as it is.

Figure 9:
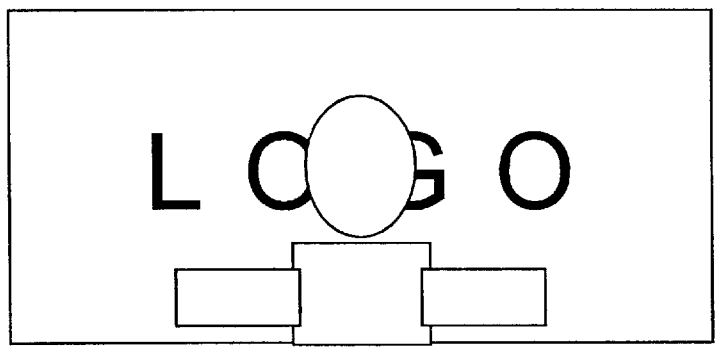
FIG. 9 is a diagram for describing a method of the present invention.
Figure 10:
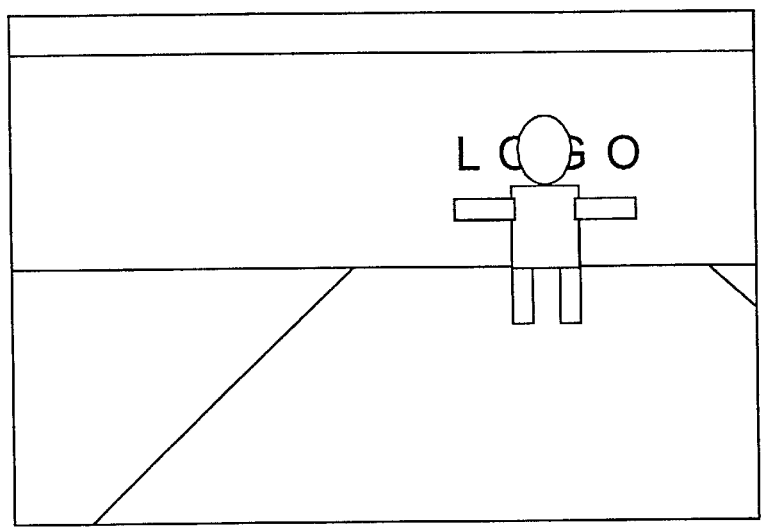
FIG. 10 is a diagram for describing a method of the present invention.

Thus, in such a manner, as shown in FIG. 9 and FIG. 10, the invisible portion due to the obstruction by a person is not replaced with a LOGO, while the visible portion of a LOGO without being obstructed by a person is replaced with a LOGO, so that the picture can be generated as if a LOGO naturally exists behind a person.

Finally, the case where one portion or all of the replacement area has been out of the frame will be described below.

Figure 11:
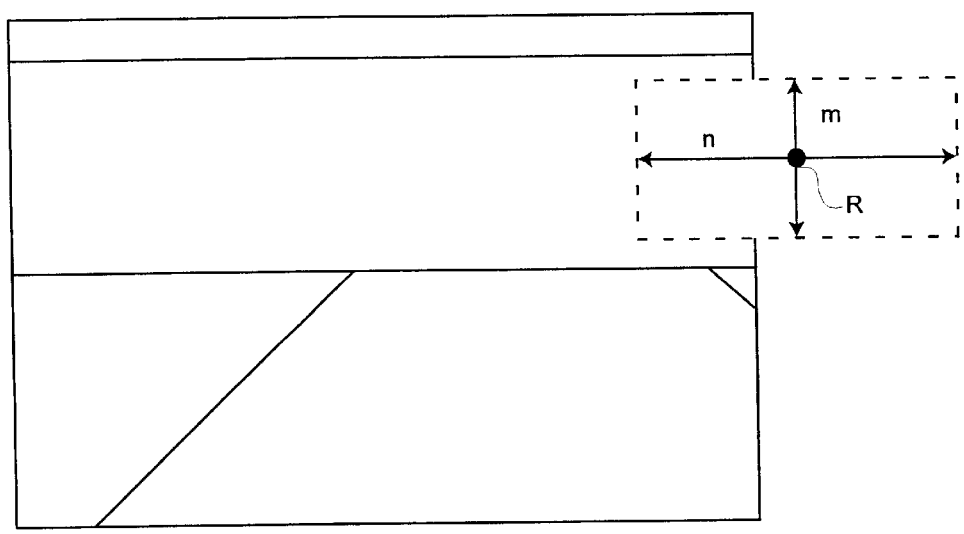
FIG. 11 is a diagram for describing a method of the present invention.

FIG. 11 is a diagram for describing the case where one portion of the replacement area has been out of the frame.

First, assuming that an address data (750, 240) of the reference position R obtained by substituting pan head data into the equation (1), and the equation (2). That is to say, it is the case where the reference position R is out of the frame. But, even in this case, as described above, a square area which is uniquely determined by the memorized vertical directional length m and horizontal directional length n is detected as a replacement area with the reference position R as center. Then, a portion of the replacement area out of the frame is omitted. This method of the omission is to determine whether address data of the pixels within the replacement area is within the frame or not.

Specifically, assuming that address data of the pixels within the replacement area is (p, q), unless the address data satisfies the following equation (3), and equation (4), the address is determined as one which is out of the frame.

$$0 < p < 720 \quad \text{equation (3)}$$

$$0 < q < 480 \quad \text{equation (4)}$$

Figure 12:
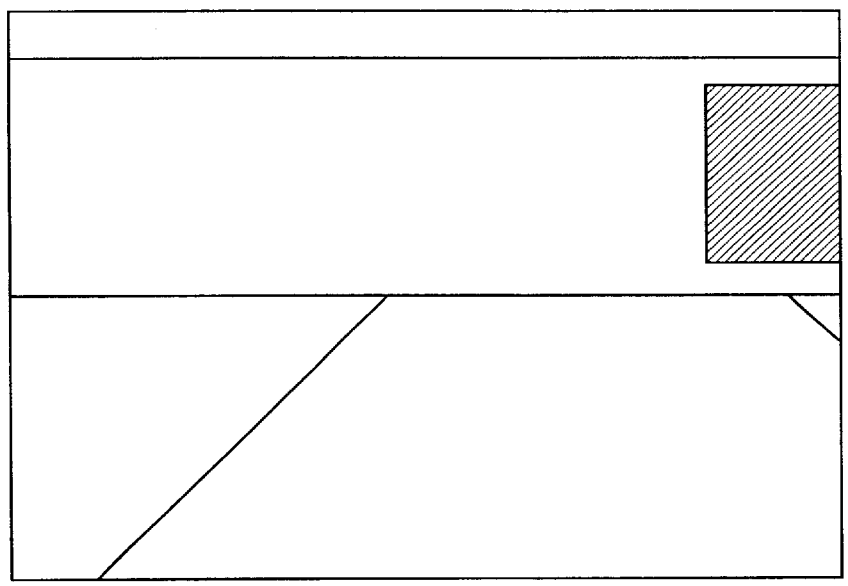
FIG. 12 is a diagram for describing a method of the present invention.

Then, the corresponding key signal is generated only for the replacement area within the frame shown in FIG. 12, and a LOGO is inserted by utilizing this key signal.

In such a manner, even if one portion or all of the replacement area has been out of the frame, the replacement area can be detected.

Next, the embodiment of a system in the present invention will be described below.

Figure 13:
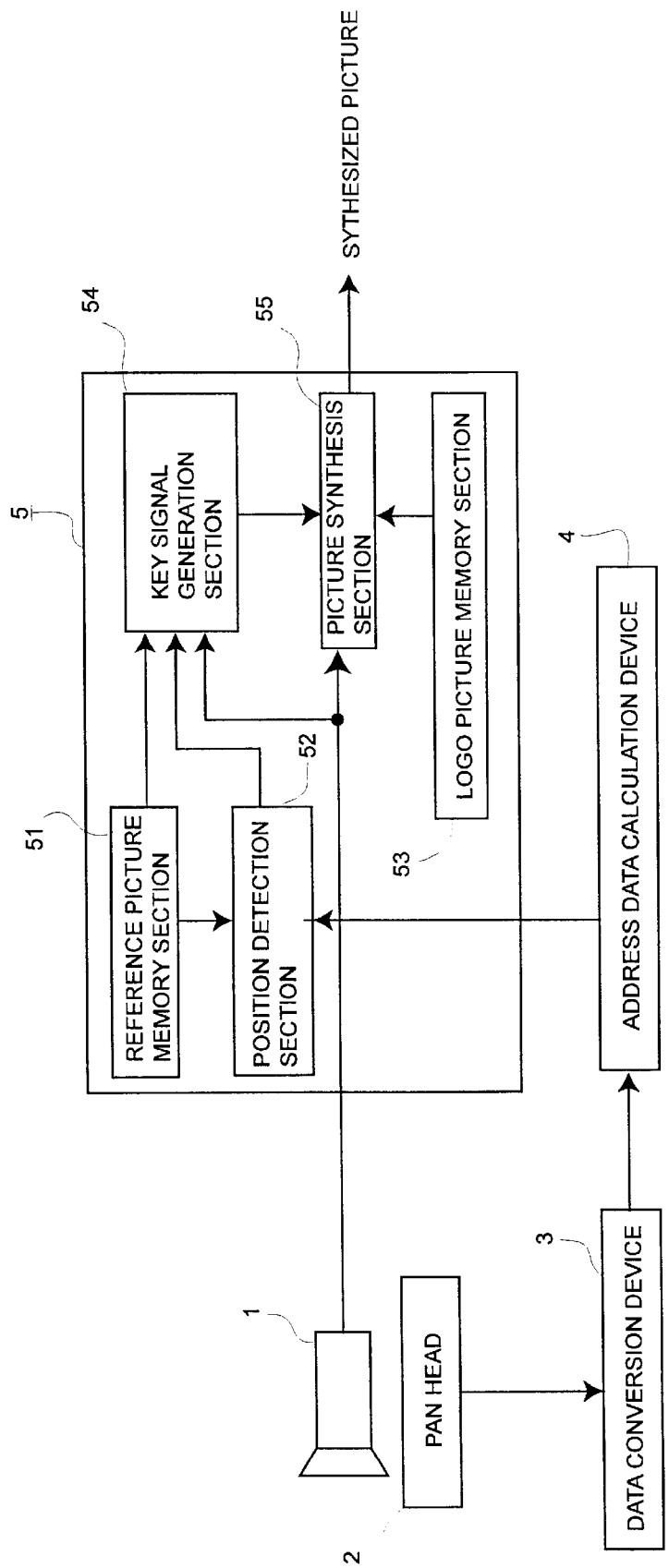
FIG. 13 is a block diagram of a system of the present invention.

FIG. 13 is a block diagram of the present embodiment of the present invention.

In FIG. 13, reference numeral 1 is a camera which shoots the subject; reference numeral 2 is a pan head in which a rotary encoder is embedded in and on which the camera 1 is mounted; reference numeral 3 is a data conversion device for converting data outputted from the pan head 2 so as to be transmitted through a voice trunk line (RS422); reference numeral 4 is an address data calculation device for converting an address data of the pan head 2 to an address data on the screen; reference numeral 5 is a picture synthesis device for performing the picture synthesis on the basis of an address data from the address data calculation device 4.

Each section will be further described in detail below.

In the pan head 2, a rotary encoder is embedded. Within this rotary encoder, the primary position of the camera 1 is set, and when the camera 1 is moved, the moved position is outputted with its movement as the camera moves. This moved position is expressed in the two dimension of pan and tilt, for example, it is outputted in such a manner as (pan, tilt)=($\alpha$, $\beta$). It should be noted that the number of significant horizontal directional pixels for one scanning line of the TV screen is usually 720 pixels. The accuracy needed for a rotary encoder in order to secure the accuracy of more than double-oversampling therefrom is 720×⅔≈500, that is to say, it is understood that the accuracy is approximately 500 pulses per one degree. Hence, in the present embodiment of the present invention, a pan head which can output 900 pulses per one degree is employed.

The address data calculation device 4 is a computer, which calculates an address data by the above described equation (1), and equation (2) on the basis of the inputted data of the pan head.

The picture synthesis device 5 is constituted of the reference picture memory section 51, the position detection section 52, the LOGO picture memory section 53, the key signal generation section 54 and the picture synthesis section 55.

The reference picture memory section 51 memorizes the reference picture which was shot by the camera 1. The memorized contents are the picture contents of the reference picture (per one pixel unit) and the size of the reference picture (replacement area). The size of the reference picture is determined by lengths of vertical and horizontal directions with the reference position which is to be center as center as shown in FIG. 5. That is to say, as data of the size, the vertical and horizontal directions are memorized.

The position detection section 52 detects a replacement area in the present picture on the basis of an address data outputted from the address data calculation device 4. This position detection is performed in the above described method. Specifically, a position of the inputted an address data (x, y) is detected on the present picture, and the replacement area in the present picture is detected by superimposing the replacement area determined by lengths of vertical and horizontal directions of the previously memorized reference picture (replacement area) with this position as center on the area occupied by inputted address data.

The LOGO picture memory section 53 memorizes a desired LOGO, that is to say, a desired LOGO picture with which one portion of the present picture is to be replaced. It should be noted that the generation of a LOGO picture is generated per one pixel unit in the same size as that of the reference picture by means of computer graphics and the like.

The key signal generation section 54 is composed of the subtracter and the key signal generating circuit. The subtracter obtains the difference between the present picture within the replacement area detected in the position detection section 52 and the reference picture memorized in the reference picture memory section 51. The key signal generating circuit is a circuit which generates a key signal on the basis of the result of the difference of the subtracter. Specifically, the key signal generating circuit generates a key signal of "0" in the case where the difference from the subtracter is 0, and generates a key signal of "1" per one pixel unit in the case where the difference from the subtracter 541 is any number except 0.

The picture synthesis section 55 is a switch selectable per one pixel unit on the basis of a key signal. To this picture synthesis section 55, the present picture from the camera 1 and the LOGO picture from the LOGO picture memory section 53 are inputted, and in the case where a key signal is "0", a LOGO picture is outputted, and in the case where a key signal is "1", the present picture is outputted. Moreover, the picture except the replacement area is outputted as it is. Therefore, the picture that the picture synthesis section 55 outputs is one in which the predetermined portion within the replacement area out of the present picture is replaced with a LOGO.

According to the system constituted in such a manner, the above described method can be achieved.

Next, the other embodiments of the present invention will be described below.

In the above described embodiment of the present invention, as for the present picture which was shot without utilizing the lens whose shooting power is changeable such as zoom lens and the like, the cases where the picture of the predetermined area is replaced with the other picture, for example, a LOGO was described. In the other embodiment of the present invention, in addition to the above described changes, the case where the present picture is shot by utilizing the lens whose shooting power is changeable such as zoom lens and the like will be described. It should be noted that as for the case where the camera is moved in two-dimensional directions, that is to say, in a pan direction and in a tilt direction, since it is similar to the above described embodiment, the description in detail is omitted.

Figure 14:
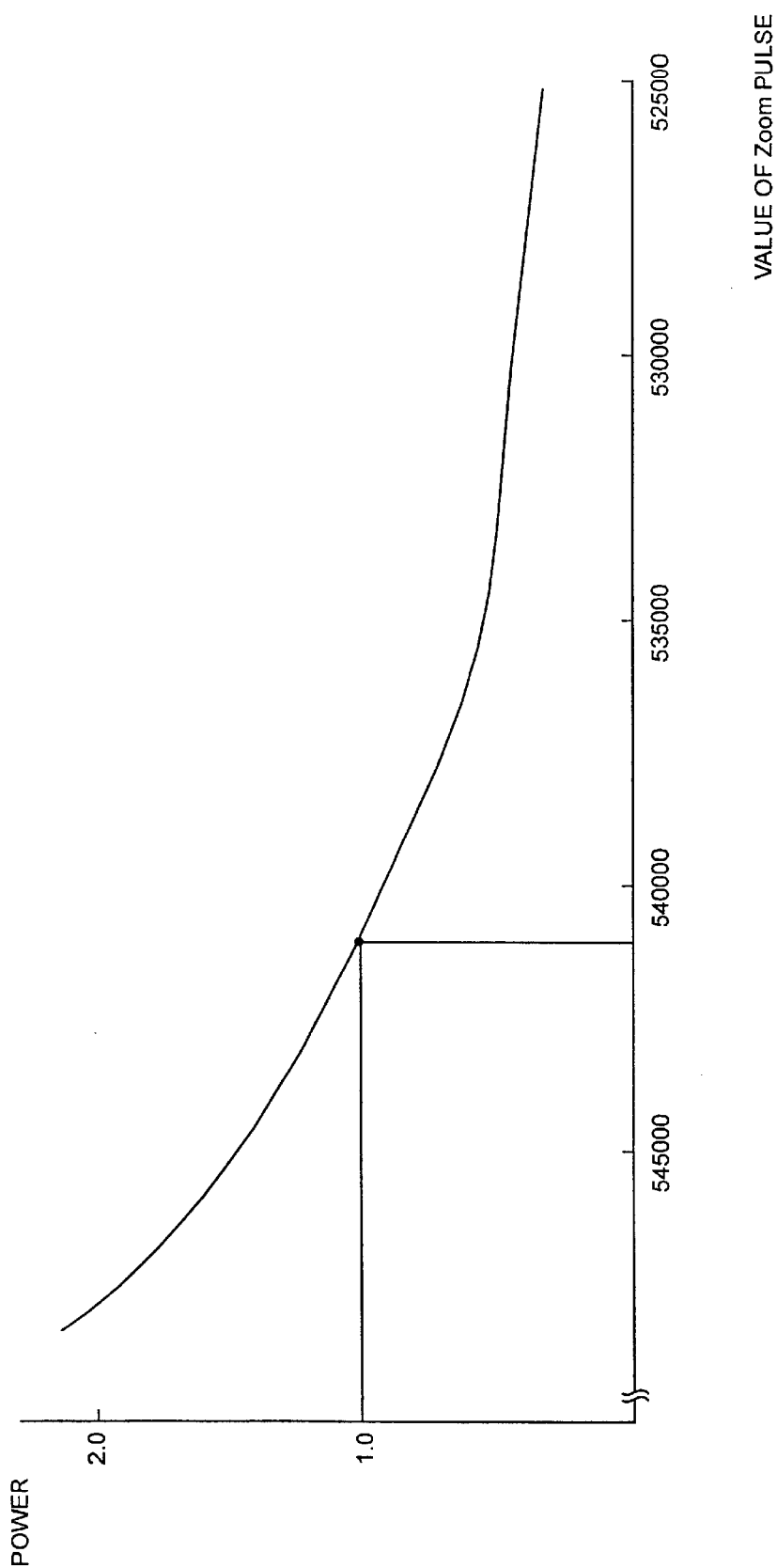
FIG. 14 is a graphical presentation showing the relationship between pulse sent from the zoom lens and power.

In the present embodiment of the present invention, the zoom lens generating pulses according to the changes of the shooting powers are employed. The function f(z) of pulses and power in this zoom lens is assumed to be expressed by the curve line shown in FIG. 14. For example, according to the function f (z), it is understood that the shooting power is 1 in the case where the pulse of 541000 from the zoom lens is received. Thus, the power of the present picture is detected by receiving the pulse from the zoom lens.

The detected data is utilized for adjustment of an address data (x, y) of the reference position R of the replacement area obtained according to the above described method.

As describing more concretely, the detected shooting power f (z) and the already obtained an address data (x, y) of the reference position R of the replacement area are substituted into the following equation (5), and equation (6), then an address data (x, y) of the reference position R of a new replacement area is obtained.

$$X=(x-360)f(z)+360 \qquad \text{equation (5)}$$

$$Y=(y-240)f(z)+240 \qquad \text{equation (6)}$$

As understood from the equation (5), and the equation (6), in the case where the power is 1, since X=x, Y=y is realized, in the case where the camera is moved in two dimensional direction, a new address data is coincident with the previous address data. Specifically, an address data (x, y) of the reference position R is adjusted according to the shooting power of the zoom lens.

Next, the detection of a replacement area will be described below.

Firstly, the size of the replacement area, the reference picture and the LOGO with which is replaced are converted into the picture of the size according to the shooting power by means of a DVE (digital video effect) using data of the shooting power. It should be noted that as for a DVE, since this is well known art, the description is omitted. Secondly, with an address data (x, y) of the adjusted reference position R as center, the converted replacement area having the size according to the shooting power is fitted into. Then, the present picture within the replacement area is extracted. It should be noted that in the case where the replacement area is out of the frame, the process similar to that of the above described method is performed.

Finally, the difference between the present picture within the replacement area converted into the picture of the size according to the shooting power and the reference picture is taken in a similar manner as the above described embodiment, and a key signal is generated. Then, a LOGO picture converted according to the power within the replacement area is inserted by the key signal.

Subsequent to the above, the system for realizing the above described method will be described below.

Figure 15:
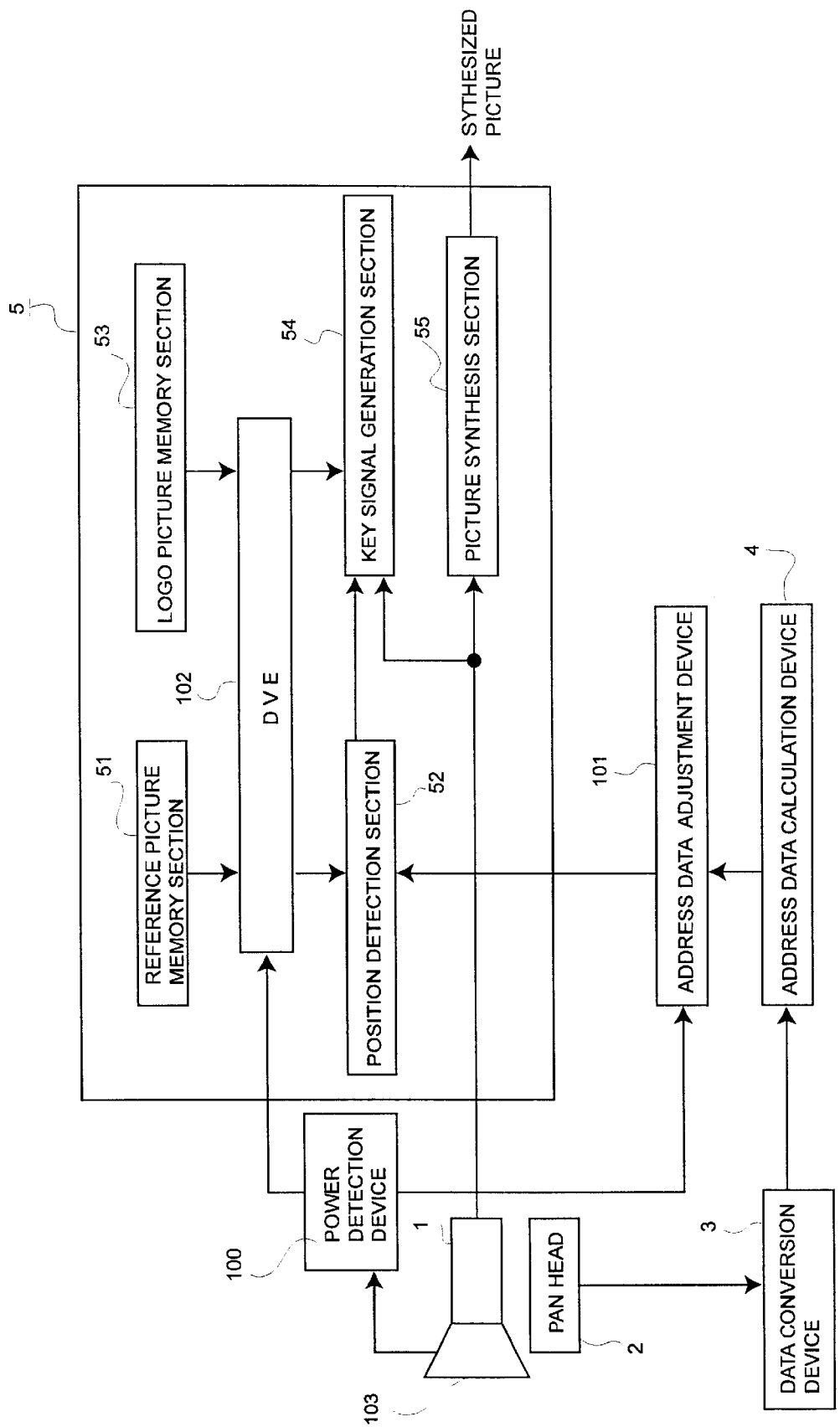
FIG. 15 is a block diagram of a system of the present invention.

FIG. 15 Is a block diagram of a system of the present invention. It should be noted that as the same reference numerals in FIG. 15 are applied to the same components with those in FIG. 13, the description in detail is omitted.

In FIG. 15, reference numeral 100 is a power detection device for detecting the shooting power when the pulse is received from the zoom lens 103. Reference numeral 101 is an address data adjustment device for adjusting an address data obtained in the address data calculation section 4 on the basis of the detected power. Reference numeral 102 is a DVE for converting the reference picture and a LOGO picture to the size according to the detected shooting power. Reference numeral 103 is a zoom lens mounted on the camera 1.

In the system constituted in such a manner, the present picture is replaced with a LOGO through the following operations described below.

First, the power detection device 100 receives the pulse from the zoom lens 103 mounted on the camera 1, and detects the shooting power. It should be noted that the detecting method is one as described above. The obtained shooting power is sent to the address data adjustment device 101 and the DVE 102.

On the other hand, an address data in two dimension is calculated by the data conversion device 3 and the address data calculation device 4 as described above, according to the data obtained from the pan head 2.

The address data adjustment device 101 adjusts an address data obtained by the address data calculation device 4 on the basis of the detected shooting power by the equation (5), and the equation (6).

Moreover, in the DVE 102, the sizes of the replacement area memorized in the reference picture memory section 51 and the reference picture and the size of a LOGO picture memorized in the LOGO picture memory section 53 are converted into the sizes according to the detected shooting power.

In the position detection section 52, the replacement area is detected from an address data of the reference position R adjusted in the address data adjustment device 101 and the size of the replacement area changed according to the shooting power, and this detected replacement area is sent to the key signal generation section 54.

In the key signal generation section 54, the reference picture changed according to the power and the present picture within the detected replacement area are compared, and a key signal is generated.

Then, in the picture synthesis section 55, the LOGO picture converted to the size according to the power is inserted within the replacement area of the present picture in the same manner as in the above described operation by the generated key signal.

In such a manner, the picture of the replacement area is replaced with a LOGO corresponding to changes of the present picture as if the picture of the replacement area is just like a portion of the present picture.

According to the present invention, the picture of the replacement area can be replaced with a LOGO corresponding to changes of the present picture as if the picture of the replacement area is just like a portion of the present picture. Specifically, as for the portion of the picture out of the picture which should be replaced with a LOGO, the portion of the picture which can not be originally seen since it is obstructed by a person, an object or the like, is not replaced with a LOGO resulting in the present picture remaining as it is, and as the other portion is replaced with a LOGO, the replaced LOGO is displayed as if the converted LOGO originally might have been existed in its place. Therefore, the present invention is suitable to the broadcast field and the like.

What is claimed is:

1. A picture replacement system for replacing a picture of a predetermined area out of a present picture with a desired LOGO picture, said picture replacement system comprising:
   a pan head;
   a camera set on said pan head;
   a rotary encoder embedded in said pan head for detecting movement amount of a camera and outputting movement amount as a movement information;
   reference picture memorizing means in which a reference picture being as a reference of a replaced area was stored;
   LOGO picture memorizing means in which a replacing LOGO picture was stored;
   position detection means for detecting a position of a replacement area in the present picture shot by said camera based on said movement information;
   key signal generating means for comparing the present picture within the replacement area detected in said position detecting means with the reference picture within said replacement area memorized in said reference picture memorizing means and generating a key signal indicating a portion in which the present picture and the reference picture are identical or different; and
   replacing means for replacing a portion in which the present picture and the reference picture are identical with the LOGO picture corresponding to said identical portion out of said LOGO picture based on said key signal.

2. A picture replacement system as claimed in claim 1, wherein a size of the reference picture is stored as well as the reference picture is stored per one pixel unit in said reference picture memorizing means.

3. A picture replacement system as claimed in claim 1 or 2, wherein said position detecting means has converting means for converting the movement information to an address information of a screen and position area detecting means for detecting the replacement area in the present picture based on said address information and a size of the reference picture.

4. A picture replacement system as claimed in claim 3, wherein said replacing means is a switch selectable per one pixel unit based on the key signal, this switch switches to a side of inputting a corresponding LOGO picture when the key signal indicates that the present picture and the reference picture are identical, and switches to a side of inputting the present picture when the key signal indicates that the present picture and the reference picture are different, and only the identical portion between the present picture and the reference picture within the replacement area of the present picture.

5. A picture replacement system as claimed in claim 3, wherein said picture replacement system further comprises a lens whose shooting power is changeable and outputting a power information according to a shooting power, replacement area adjusting means for adjusting the replacement area detected by said position detecting means based on said power information, and means for changing the LOGO picture memorized in said LOGO picture memorizing means.

6. A picture replacement system as claimed in claim 1 or 2, wherein said replacing means is a switch selectable per one pixel unit based on the key signal, this switch switches to a side of inputting a corresponding LOGO picture when the key signal indicates that the present picture and the reference picture are identical, and switches to a side of inputting the present picture when the key signal indicates that the present picture and the reference picture are different, and only the identical portion between the present picture and the reference picture within the replacement area of the present picture.

7. A picture replacement system as claimed in claim 6, wherein said picture replacement system further comprises a lens whose shooting power is changeable and outputting a power information according to a shooting power, replacement area adjusting means for adjusting the replacement area detected by said position detecting means based on said power information, and means for changing the LOGO picture memorized in said LOGO picture memorizing means.

8. A picture replacement system as claimed in claim 1 or 2, wherein said picture replacement system further comprises a lens whose shooting power is changeable and outputting a power information according to a shooting power, replacement area adjusting means for adjusting the replacement area detected by said position detecting means based on said power information, and means for changing the LOGO picture memorized in said LOGO picture memorizing means.

9. A picture replacement system for replacing a picture of a predetermined area out of a present picture with a desired LOGO picture, said picture replacement system comprising:

a pan head;

a camera set on said pan head;

a rotary encoder embedded in said pan head for detecting two dimensional movement amount of a camera and outputting a detected movement amount as a movement information;

reference picture memorizing means in which a reference position of a replacement area and lengths of vertical and horizontal directions of the replacement area with said reference position as a reference were stored as well as a reference picture being as a reference of the replacement area was stored;

LOGO picture memorizing means in which a replacing LOGO picture was stored;

calculating means for calculating an address of the reference position of said replacement area in the present picture based on said movement information;

replacement area detecting means for detecting the replacement area in the present picture from lengths of vertical and horizontal directions of said replacement area with said calculated address as a reference position;

key signal generating means for comparing the present picture within said detected replacement area with the reference picture within said replacement area and generating a key signal indicating pixels where the present picture and the reference picture are identical or different; and replacement means for replacing an identical portion between the present picture and the reference picture with the LOGO picture corresponding to said identical portion out of said LOGO picture based on said key signal.

10. A picture replacement system as claimed in claim 9, wherein said calculating means has previously memorized movement information ($\alpha$, $\beta$) and an address (A, B) of the reference position of the replacement area at a time when the replacement area is at a first position of a screen, and movement information ($\gamma$, $\delta$) and an address (C, D) of the reference position of the replacement area at a time when the replacement area is at a second position of the screen, a movement information ($\lambda$, $\mu$) being available at a time when the replacement area moved to a given position of the present picture is substituted into the following equations expressed by, $$x = A + (\lambda - \alpha)(C-A)/(\gamma - \alpha)$$

$$y = B + (\mu - \beta)(D-B)/(\delta - \beta)$$

an address (x, y) of the reference position of the replacement area at a time when the replacement area moved to the given position is calculated.

11. A picture replacement system as claimed in claim 9 or 10, wherein said replacement area detecting means determines whether an address of each pixel within the detected replacement area with an address of the reference position as center is within a frame or not and further has means for detecting an area constituted of only pixels of addresses determined within said frame as the replacement area.

12. A picture replacement system as claimed in claim 11, wherein said replacement means is a switch selectable per one pixel unit based on the key signal, when the key signal indicates that the present picture and the reference picture are identical, this switch switches to a side of inputting a corresponding LOGO picture, and when the key signal indicates that the present picture and the reference picture are different, this switch switches to a side of inputting the present picture, and only the identical portion between the present picture and the reference picture within the replacement area of the present picture is replaced with the LOGO picture.

13. A picture replacement system as claimed in claim 11, said picture replacement system comprising:

a lens whose shooting power is changeable and outputting a power information according to a shooting power;

picture converting means for changing a size of memorized LOGO picture, sizes of a memorized reference picture and the reference picture to sizes according to the shooting power on said power information;

adjusting means for adjusting an address of the reference position of a calculated replacement area based on said power information;

said replacement area detecting means for detecting the replacement area from an address of said adjusted reference position and a size of said changed reference picture;

said key signal generating means for comparing the present picture within said detected replacement area with said reference picture whose size is changed and generating the key signal indicating that pixels where the present picture and the reference picture are identical or different; and said replacement means for replacing the identical portion between the present picture and the reference picture with the LOGO picture corresponding to said identical portion out of said LOGO picture whose size is changed.

14. A picture replacement system as claimed in claim 9 or 10, wherein said replacement means is a switch selectable per one pixel unit based on the key signal, when the key signal indicates that the present picture and the reference picture are identical, this switch switches to a side of inputting a corresponding LOGO picture, and when the key signal indicates that the present picture and the reference picture are different, this switch switches to a side of inputting the present picture, and only the identical portion between the present picture and the reference picture within the replacement area of the present picture is replaced with the LOGO picture.

15. A picture replacement system as claimed in claim 14, said picture replacement system comprising:

a lens whose shooting power is changeable and outputting a power information according to a shooting power;

picture converting means for changing a size of memorized LOGO picture, sizes of a memorized reference picture and the reference picture to sizes according to the shooting power on said power information;

adjusting means for adjusting an address of the reference position of a calculated replacement area based on said power information;

said replacement area detecting means for detecting the replacement area from an address of said adjusted reference position and a size of said changed reference picture;

said key signal generating means for comparing the present picture within said detected replacement area with said reference picture whose size is changed and generating the key signal indicating that pixels where the present picture and the reference picture are identical or different; and said replacement means for replacing the identical portion between the present picture and the reference picture with the LOGO picture corresponding to said identical portion out of said LOGO picture whose size is changed.

16. A picture replacement system as claimed in claim 9 or 10, said picture replacement system comprising:

a lens whose shooting power is changeable and outputting a power information according to a shooting power;

picture converting means for changing a size of a memorized LOGO picture, sizes of a memorized reference picture and the reference picture to sizes according to the shooting power on said power information;

adjusting means for adjusting an address of the reference position of a calculated replacement area based on said power information;

said replacement area detecting means for detecting the replacement area from an address of said adjusted reference position and a size of said changed reference picture;

said key signal generating means for comparing the present picture within said detected replacement area with said reference picture whose size is changed and generating the key signal indicating that pixels where the present picture and the reference picture are identical or different; and said replacement means for replacing the identical portion between the present picture and the reference picture with the LOGO picture corresponding to said identical portion out of said LOGO picture whose size is changed.

17. A picture replacement system as claimed in claim 16, wherein when a calculated address data is (x, y), a shooting power is f(z), a number of pixels of horizontal direction is H, and a number of pixels of vertical direction is L, an address data (X, Y) of a reference position R of a new replacement area is calculated by the following equations, $$X=(x-H/2) \times f(z)+H/2,$$

$$Y=(y-L/2) \times f(z)+L/2.$$

18. A picture replacement method for replacing a picture of a predetermined area out of the present picture with a desired LOGO picture, said picture replacement method comprising steps of:

shooting a subject and selecting a replacement area which is replaced with a LOGO picture out of the subject;

memorizing a reference position within said replacement area and lengths of vertical and horizontal directions of said replacement area with said reference position as a reference as well as a picture within said replacement area is memorized as a reference picture;

generating a replacing LOGO picture and detecting a memorizing process and a two dimensional movement amount of a camera which is shooting the present picture and outputting this movement amount as a movement information;

calculating an address of the reference position of said replacement area in the present picture based on said movement information;

detecting the replacement area in the present picture from lengths of vertical and horizontal directions of said memorized replacement area with said calculated address as the reference position;

generating a key signal indicating pixels where the present picture and the reference picture are identical or different; and replacing an identical portion between the present picture and the reference picture with a picture corresponding to said identical portion out of said LOGO picture.

19. A picture replacement method as claimed in claim 18, wherein the step of calculating an address of a reference position of the replacement area comprises steps of:

memorizing previously a movement information ($\alpha$, $\beta$) and an address (A,B) of the reference position of the replacement area at a time when the replacement area is at a first position on a screen;

memorizing previously a movement information ($\gamma$, $\delta$) and an address (C, D) of the reference position of the replacement area at a time when the replacement area is at a second position on a screen; and substituting a movement information ($\lambda$, $\mu$) being available at a time when the replacement area moved to a given position of the present picture into the following equations, $$x=A+(\lambda-\alpha)(C-A)/(\gamma-\alpha),$$

$$y=B+(\mu-\beta)(D-B)/(\delta-\beta),$$

and obtaining an address (x, y) of the reference position of the replacement area at a time when the replacement area moved to the given position.

20. A picture replacement method as claimed in claim 18 or 19, wherein the step of detecting the replacement area determines whether an address of each pixel within the detected replacement area with an address of the reference position as center is within a screen frame or not and detecting an area constituted of only pixels of addresses determined within said frame as the replacement area.

21. A picture replacement method as claimed in claim 20, wherein the step of replacing a pixel of a picture in which the present picture and the reference picture are identical with pixel data of the LOGO picture corresponding to this pixel and making a pixel of a picture in which the present picture and the reference picture are different as pixel data of the present picture as it is.

22. A picture replacement method as claimed in claim 20, said picture replacement method further comprising steps of:

detecting a shooting power;

changing a size of a memorized LOGO picture; sizes of a memorized reference picture and the reference picture to sizes based on said shooting power;

adjusting an address of the reference position of a calculated replacement area based on a power information;

detecting the replacement area from an address of said adjusted reference position and a size of said changed reference picture;

comparing the present picture within said detected replacement area with said reference picture whose size is changed and generating the key signal indicating a pixel where present picture and the reference picture are identical or different; and replacing the identical portion between the present picture and the reference picture with the LOGO picture corresponding to said identical portion out of said LOGO picture whose size is changed based on said key signal.

23. A picture replacement method as claimed in claim 18 or 19, wherein the step of replacing a pixel of a picture in which the present picture and the reference picture are identical with pixel data of the LOGO picture corresponding to this pixel and making a pixel of a picture in which the present picture and the reference picture are different as pixel data of the present picture as it is.

24. A picture replacement method as claimed in claim 23, said picture replacement method further comprising steps of:

detecting a shooting power;

changing a size of a memorized LOGO picture; sizes of a memorized reference picture and the reference picture to sizes based on said shooting power;

adjusting an address of the reference position of a calculated replacement area based on a power information;

detecting the replacement area from an address of said adjusted reference position and a size of said changed reference picture;

comparing the present picture within said detected replacement area with said reference picture whose size is changed and generating the key signal indicating a pixel where the present picture and the reference picture are identical or different; and replacing the identical portion between the present picture and the reference picture with the LOGO picture corresponding to said identical portion out of said LOGO picture whose size is changed based on said key signal.

25. A picture replacement method as claimed in claim 18 or 19, said picture replacement method further comprising steps of:

detecting a shooting power;

changing a size of a memorized LOGO picture, sizes of a memorized reference picture and the reference picture to sizes based on said shooting power;

adjusting an address of the reference position of a calculated replacement area based on a power information;

detecting the replacement area from an address of said adjusted reference position and a size of said changed reference picture;

comparing the present picture within said detected replacement area with said reference picture whose size is changed and generating the key signal indicating a pixel where the present picture and the reference picture are identical or different; and replacing the identical portion between the present picture and the reference picture with the LOGO picture corresponding to said identical portion out of said LOGO picture whose size is changed based on said key signal.

26. A picture replacement system as claimed in claim 25, wherein when a calculated address data is (x, y), a shooting power is f(z), a number of pixels of horizontal direction is H, and a number of pixels of vertical direction is L, a step of adjusting an address of the reference position calculates an address data. (X, Y) of the reference position R of a new replacement area by following equations, $$X=(x-H/2)f(z)+H/2,$$

$$Y=(y-L/2)f(z)+L/2.$$

* * * * *